H. W. SMITH.
VEHICLE SPRING.
APPLICATION FILED NOV. 11, 1908.
959,892.
Patented May 31, 1910.
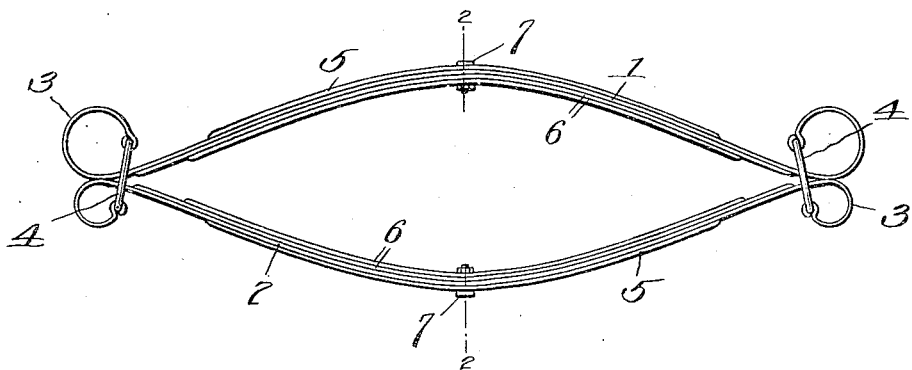
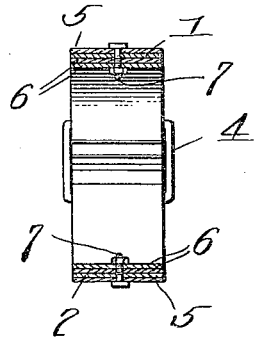
Witnesses
Oliver W. Holmes
E. B. McBath
Inventor
H. W. Smith
By Meara & Brock
Attorney

UNITED STATES PATENT OFFICE.

HENRY WALLACE SMITH, OF CANTON, OHIO.

VEHICLE-SPRING.

959,892.   Specification of Letters Patent.   Patented May 31, 1910.

Application filed November 11, 1908. Serial No. 462,078.

*To all whom it may concern:*

Be it known that I, HENRY WALLACE SMITH, a citizen of the United States, residing at Canton, in the county of Stark and State of Ohio, have invented a new and useful Improvement in Vehicle-Springs, of which the following is a specification.

This invention relates to a vehicle spring, and the object of the invention is a spring which will cause the vehicle body to ride as easily with a light load as with a heavy one and which will also relieve both the spring and the vehicle body of the effects of sudden jars, such as might be caused by a wheel dropping into a rut, or hollow, this last advantage being especially secured by a novel construction of the ends of the spring, with means for securing the spring, so as to leave its extreme ends free.

In the accompanying drawings:—Figure 1 is a side elevation of the preferred form of my spring. Fig. 2 is a transverse section taken through the spring, on the line 2—2 of Fig. 1.

In carrying out the invention, I construct the spring of upper and lower main springs, supplemental outside springs and supplemental inside springs.

In these drawings, 1 and 2 represent respectively the upper and lower main springs, the said springs inclosing an oval space between them, the end portions of said springs being bent in the form of scrolls as shown at 3, the scrolls of the main spring 1 being slightly larger than those of the spring 2, and the ends of the scrolls are connected by rigid bars 4, said bars inclining downwardly, and outwardly with respect to the space inclosed within the body portions of the springs. These springs come in contact adjacent said connecting bars, but their extreme end portions which are formed by the scrolls 3 are free to give in a vertical direction, the bars 4 not only securing the end portions of the scrolls together, but by their angle of inclination hold the entire spring rigid and free from longitudinal movement. Each of the main springs is strengthened and braced by an exterior supplemental spring 5, said springs 5 being fitted to the outer faces of the springs 1 and 2, respectively. Within the space inclosed by said springs 1 and 2 I place interior supplemental springs or leaves 6, which bear upon the main springs at all times. It will be obvious that only two interior springs may be employed one in coöperation with each of the main springs, or there may be several of the interior springs to each main spring.

Suitable bolts 7 with the usual nuts upon them hold each set, upper and lower, of springs in their proper relation to each other.

By means of a spring constructed as above described, the strength of the spring is equalized as the load increases, and the vehicle will ride as easily with a light load supported only by the main springs as with a heavy load, when all of the springs are sustaining by their combined strength the weight placed upon them.

What I claim is:—

1. A vehicle spring consisting of upper and lower main springs, the upper spring having its end portions resting upon the end portions of the lower spring, the end portion of each spring being bent to form a scroll, said scrolls being oppositely formed, rigid inclined bars connecting the ends of adjacent scrolls, interior springs bearing on the main springs throughout their body portions, and means for securing said interior springs in their normal position with respect to the main springs.

2. A vehicle spring comprising upper and lower main springs, the ends of said springs being bent to form upwardly and downwardly extending scrolls, respectively, the scrolls of the upper spring being larger than those of the lower spring, rigid bars inclining out of the perpendicular, said bars connecting the ends of the upper scrolls to the ends of the lower scrolls, exterior supplemental springs, and interior supplemental springs arranged substantially as and for the purpose described.

HENRY WALLACE SMITH.

Witnesses:
ISAAC HOWARD LUTWELL,
ARNOLD ELIE STUCKI.